April 8, 1941. J. R. SNYDER 2,237,319
SHOCK ABSORBER AND MOUNTING THEREFOR
Filed Oct. 7, 1939 3 Sheets-Sheet 1

INVENTOR.
JACOB R. SNYDER
Kwis Hudson & Kent
ATTORNEYS

April 8, 1941.  J. R. SNYDER  2,237,319
SHOCK ABSORBER AND MOUNTING THEREFOR
Filed Oct. 7, 1939  3 Sheets-Sheet 2
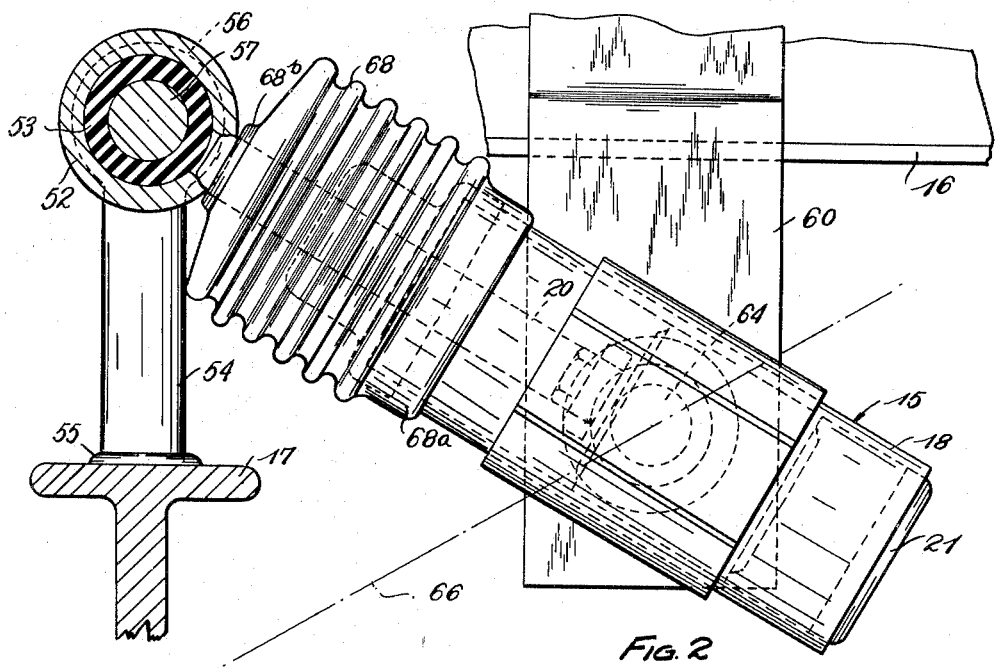
Fig. 2
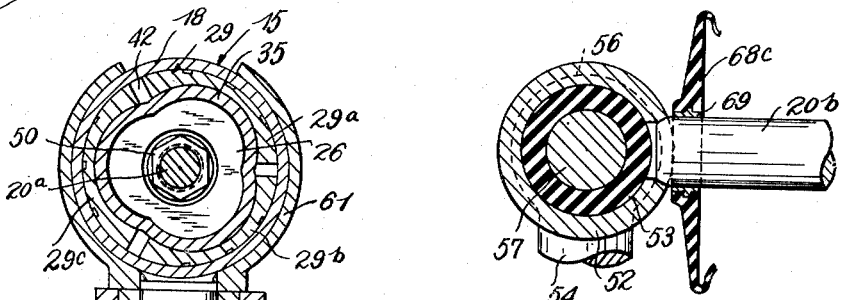
Fig. 3   Fig. 9
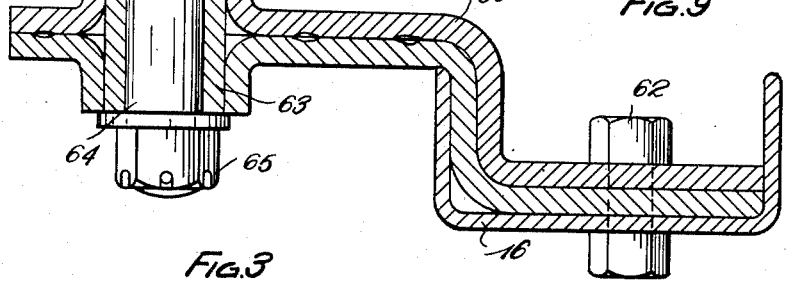
INVENTOR.
JACOB R. SNYDER
BY
Kwis Hudson & Kent
ATTORNEYS April 8, 1941.   J. R. SNYDER   2,237,319
SHOCK ABSORBER AND MOUNTING THEREFOR
Filed Oct. 7, 1939   3 Sheets-Sheet 3
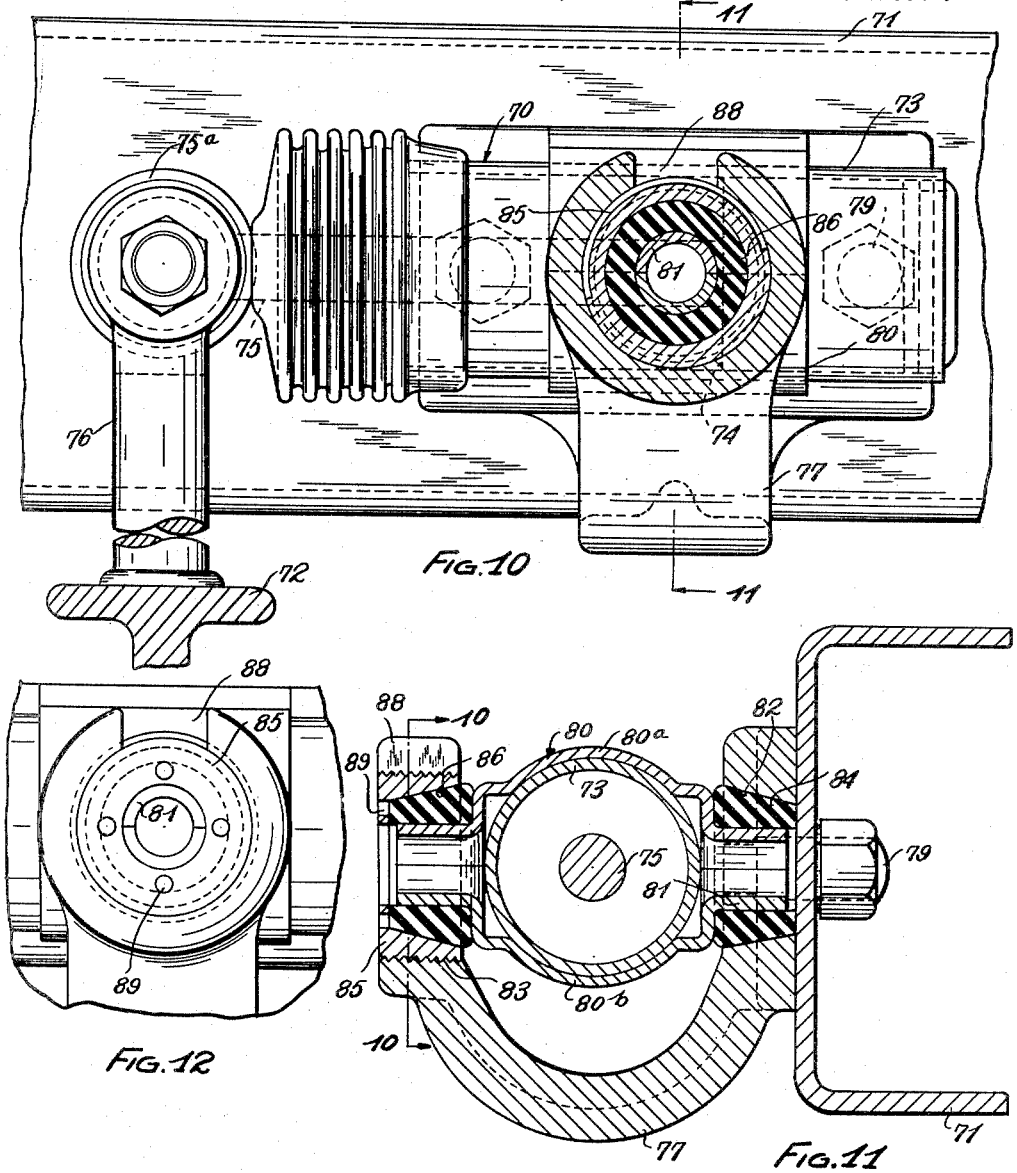
INVENTOR.
JACOB R. SNYDER
BY
Kwis Hudson & Kent
ATTORNEYS Patented Apr. 8, 1941

2,237,319

UNITED STATES PATENT OFFICE 2,237,319

SHOCK ABSORBER AND MOUNTING THEREFOR

Jacob Rush Snyder, Cleveland, Ohio, assignor to Thompson Products, Inc., Cleveland, Ohio, a corporation of Ohio Application October 7, 1939, Serial No. 298,474

6 Claims. (Cl. 188—129)

This invention relates to shock absorbing equipment and more particularly to an improved shock absorber and a novel mounting therefor.

An object of the present invention is to provide an improved shock absorber of the type embodying an expansible friction sleeve and an expander and in which the cooperating portions of the expander and sleeve are so formed that a surface contact of a substantial area is always maintained therebetween and results in a smooth and efficient shock absorbing function with minimum wear.

Another object of my invention is to provide an improved mounting for a shock absorber, of the type having an elongated cylinder with a resistance device reciprocable therein, whereby the cylinder is connected with one of a pair of relatively movable parts to be retarded and is supported so as to have swinging movement to either side of a neutral position.

Still another object of my invention is to provide an improved mounting for a shock absorber, of the type having an elongated cylinder and a reciprocable actuating rod extending therefrom, wherein the actuating rod has pivotal connection with one of a pair of relatively movable parts to be retarded and means connected with the other of said parts supports the cylinder for swinging to either side of a neutral position and about a transverse axis located intermediate the ends of the cylinder.

A further object of my invention is to provide an improved shock absorber mounting, of the type referred to, in which the cylinder of the shock absorber has a trunnioned member thereon and a second member adapted to be connected with one of the relatively movable parts to be retarded has bearing means for rockably supporting the trunnioned member and cylinder.

This invention may be further briefly summarized as consisting in certain novel combinations and arrangements of parts hereinafter described and more particularly set out in the appended claims.

In the accompanying sheets of drawings,

Fig. 2 is another elevation showing my improved shock absorber and mounting with certain of the parts in section and with the shock absorber swung from its neutral or mid position to a position corresponding with a compressed condition of the vehicle springs;

Fig. 3 is a transverse sectional view taken through the shock absorber and mounting as indicated by line 3—3 of Fig. 1;

Fig. 4 is a detached view, partly in section showing an expander of the form used in my improved shock absorber;

Fig. 4a is an end view of the expander;

Fig. 5 is a detached view showing one of the segments of the friction sleeve of my shock absorber;

Fig. 6 is an end view of the segment;

Figure 1:
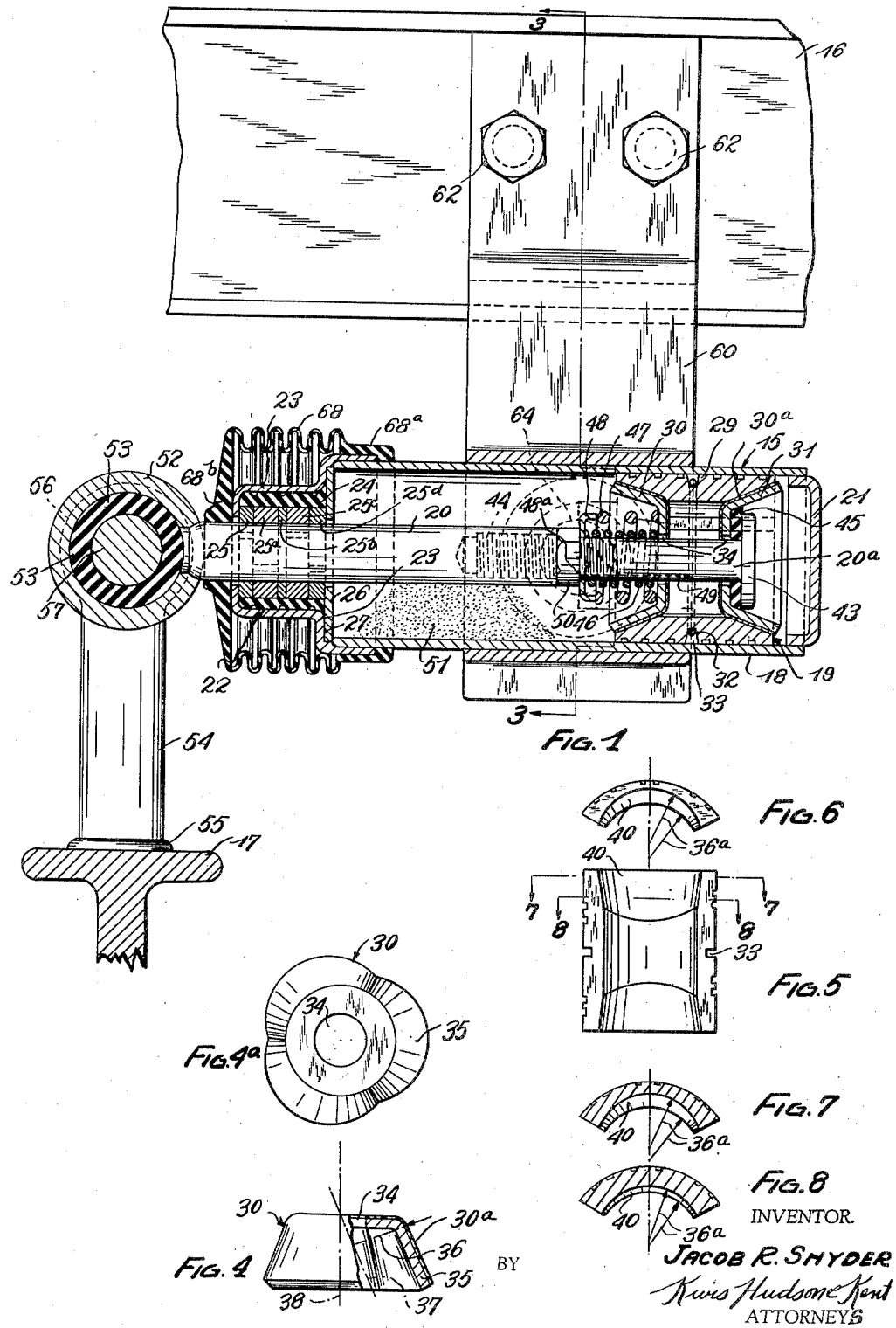
Fig. 1 is an elevation showing my improved shock absorber and mounting, with the shock absorber and certain portions of the mounting shown in section.

Figs. 7 and 8 are transverse sectional views taken through the segment at longitudinally spaced points as indicated by section lines 7—7 and 8—8 of Fig. 5;

Fig. 9 is a partial sectional view of the structure at one end of my shock absorber showing a modified form of dust shield;

Fig. 10 is an elevation, with certain parts in section, showing my improved shock absorber and another form of mounting therefor;

Fig. 11 is a transverse sectional view taken through the shock absorber and mounting as indicated by line 11—11 of Fig. 10; and Fig. 12 is a partial side elevation further illustrating this modified form of my shock absorber mounting.

More detailed reference will now be made to the accompanying drawings in which I have illustrated an improved construction for a direct-acting friction shock absorber and have also illustrated an improved mounting for applying a shock absorber to a pair of relatively movable parts or vehicle members to be retarded. Before proceeding with the detailed description it will be understood, of course, that the invention is not to be regarded as limited to the particular arrangements and details of construction herein disclosed, because the invention may be embodied in various other similar devices and arrangements coming within the scope of the appended claims.

In Figs. 1 to 3 I show my improved shock absorber 15 applied to a pair of relatively movable parts 16 and 17 for resisting or retarding relative movement therebetween. While my improved shock absorber and its mounting are appliable to various uses, they are particularly well-suited for use on motor vehicles, and for that reason, the parts 16 may be regarded as a vehicle frame and the part 17 may be regarded as an axle which is connected with the frame by the usual vehicle springs.

The shock absorber 15 may be generally similar to the direct-acting friction shock absorber disclosed in my copending application, Serial No. 230,469, filed September 17, 1938, but is in certain respects an improvement thereover. This shock absorber may comprise an elongated or tubular cylinder 18 having a resistance member or unit 19 reciprocable therein and an actuating rod 20 which is connected with the resistance device 19 and projects from the cylinder for connection with one of the relatively movable vehicle parts, in this instance the axle 17. The cylinder 18 may comprise a tube or barrel which is closed at its inner end by a suitable cap or cover 21 and which is provided at its other end with a combined bearing and sealing device 22 in which the rod 20 is guided during the operation of the shock absorber.

The bearing and sealing device 22 may comprise a hollow cover member 23 which is adapted to be screwed or otherwise connected to the outer end of the cylinder barrel and which houses a plurality of bearing and packing elements surrounding the rod 20. These elements may include a rubber bushing or sleeve 24 having seated therein a plurality of rings 25a, 25b, 25c and 25d, formed of metal, composition or any other suitable material and in which the rod 20 is slidable. These packing and bearing elements may be retained in the hollow cover member 23 by a transverse inner cover or plate 26 disposed between the outer end of the cylinder barrel and the annular shoulder 27 of the cover 23.

The resistance unit 19 may be in the form of a plunger frictionally operable in the cylinder 18 and may comprise a segmental or longitudinally split sleeve 29 and a pair of expanders 30 and 31 which cooperate with opposite ends of the sleeve. As shown in Fig. 3, the sleeve 29 may have three circumferentially spaced segments 29a, 29b and 29c, although any desired number of segments may be provided. These segments are preferably formed of a composition which is highly resistant to wear, but could be formed of metal or any other suitable material. The outer faces of the segments are curved transversely to the same radius of curvature as the inner face of the cylinder so that the sleeve formed by the segments will substantially fit the cylinder and be smoothly slidable therein. The inner faces of the segments are curved transversely to a smaller radius of curvature than the cylinder, and as will be presently explained, are so formed that the expanders 30 and 31 may cooperate with opposite ends of the sleeve to expand the same. The segments may be retained in the desired assembled relation, that is to say in sleeve-form, by a spring ring 32 which surrounds the segments and engages in the circumferential groove 33 thereof.

The expanders 30 and 31 are carried by the actuating rod 20 and seat in opposite ends of the sleeve 29, as shown in Fig. 1. These expanders may be formed of any suitable material, but are preferably constructed of metal and are of tapered cup-like form and have a central opening 34 through which the screw or extension portion 20a of the actuating rod 20 extends. As will be noted from Figs. 3 and 4a, the expanders 30 and 31 are not of frusto-conical shape but are of lobular form. In the present embodiment in which the sleeve 29 has three segments, the expanders 30 and 31 each have three lobes 35 thereon. These lobes are transversely curved and are tapered longitudinally, and as indicated in Fig. 4 of the drawings, this transverse curvature has a radius 36 which is constant for all points therealong. In other words, the radii 36 defining the transverse curvature of the outer surface of the lobe 35 all have their centers on a line 37 which is inclined relative to the longitudinal axis 38 of the device.

The inner faces of the segments of the sleeve 29 with which the lobes 35 of the expanders cooperate, are provided with correspondingly shaped arcuate recesses 40 in which the lobes of the expanders engage. These recesses of the segments are longitudinally tapered to substantially the same taper angle as that of the expanders and are transversely curved to substantially the same radius of curvature as that of the outer faces of the lobes of the expanders. In other words, the radius of transverse curvature of the recesses 40 of the segments, indicated by the line 36a, is substantially the same as the radius 36 of the transverse curvature of the expanders, and the transverse curvature of the recesses 40 has the same radius at all points therealong as is indicated by the radii 36a shown in Figs. 6, 7 and 8.

Expansion of the sleeve 29 of the resistance unit 19 for frictional cooperation with the inner surface of the cylinder 18 is caused by relative longitudinal movement between the segments and one of the expanders, as will be explained more in detail hereinafter, and in providing the segments and expanders with the interengaging recesses and lobes of the form above described, I obtain certain important advantages. One advantage is that the lobes of the expanders hold the segments of the sleeve in a desired definitely spaced relation whereby the longitudinal intervening spaces 42 are maintained between the adjacent edges of the segments to provide spaces for the passage of air from one side of the resistance unit to the other as it is reciprocated in the cylinder. Another advantage is that the constant radius of curvature for the lobes of the expanders and the recesses 40 of the segments insures a full surface contact at all times between the expanders and segments. In other words, relative longitudinal movement between an expander and the sleeve 29 will not result in the surface contact being changed to a line contact, as has occurred heretofore in all prior devices with which I am familiar, and has resulted in an abrading or scraping action causing rapid wear in those devices.

The extension 20a of the actuating rod 20, which carries the expanders 30 and 31, may be in the form of a screw having a head 43 which is received in the expander 31 and a threaded portion 44 at its other end which engages in a threaded opening of the rod 20. If desired, a washer 45 of soft rubber or other suitable resilient material may be interposed between the head 43 and the expander 31. A pair of compression springs 46 and 47 may be disposed around the extension 20a between the expander 30 and a cup-shaped washer 48. This washer may have a tongue-like projection 48a engaging in a longitudinal groove 49 of the extension 20a which permits the washer to be used as a means for rotating the extension relative to the rod 20 for adjusting the compression of the spring 46. A lock nut 50 serves to lock the extension 20a in the desired position of adjustment and also forms a shoulder against which the washer 48 seats.

The spring 46 is relatively light as compared with the spring 47 and is also somewhat longer than the spring 47. By subjecting the spring 46 to an initial compression by screwing the extension 20a into the rod 20, the expanders 30 and 31 will be urged toward each other and the sleeve 29 will be expanded sufficiently to create an initial frictional resistance between the sleeve and cylinder wall. This initial frictional resistance will tend to retain the resistance unit 19 stationary so that longitudinal movement of the actuating rod will cause one or the other of the expanders to produce a further expansion of the sleeve which will result in a shock-absorbing resistance being quickly built up in the device. In assembling the resistance unit 19 the spring 46 is placed under initial compression, preferably up to the point of engagement of the washer 48 with the stiffer spring 47 but without subjecting the latter spring to an initial load.

I find that an improved shock absorbing action can be obtained by providing the expanders with a coating 30a on the outer working surface thereof which will impart to the expanders a surface of glass-like smoothness. This extremely smooth surface characteristic of the expanders provides a lower coefficient of the friction between the same and the segments of the sleeve 29 than exists between the segments and the surface of the cylinder wall. The coating 30a used on the expanders may be a fired vitreous enamel or may be a metallic coating such as a coating of chromium, or may be a coating of any other suitable material capable of giving the expanders a surface of glass-like smoothness which is a decidedly smoother surface characteristic than could be obtained by the usual machining, grinding and polishing operations.

In the cylinder 18 I may provide a quantity of loose coating and lubricating powder 51 which will be violently agitated during reciprocation of the resistance unit 19 in the cylinder. As explained in said copending application, this powder serves to coat and lubricate the moving parts of the device and results in decreased wear and in the attainment of a smooth shock absorbing function which is substantially unaffected by temperature changes. Escape of the powder 51 from the cylinder is prevented by the combined bearing and sealing device 22 which closes the outer end of the cylinder.

The mounting herein disclosed for operably connecting the shock absorber 15 with the relatively movable vehicle parts 16 and 17 constitutes another feature of my invention which will now be explained. As shown in Figs. 1 to 3 this mounting comprises a means for connecting the actuating rod 20 with one of the relatively movable parts, in this instance the axle 17, and a means for connecting the cylinder 18 with the other of the relatively movable parts, in this instance the frame 16 of the vehicle, so as to permit rocking or swinging of the shock absorber to either side of its neutral position shown in Fig. 1 in which the longitudinal axis of the device lies in a plane extending substantially normal to the direction of relative movement between the parts 16 and 17 to be retarded.

The connection between the actuating rod 20 of the shock absorber and the axle 17 is a pivotal connection so that the above-mentioned rocking or swinging of the shock absorber can take place. This connection may be of any suitable form and may comprise an eye 52 on the outer end of the actuating rod 20 which is pivotally connected with the axle 17 either directly or by means of an arm 54 which may be rigidly connected with the axle by welding 55 or other means. The eye 52 may have a resilient bushing 53 therein and the arm 54 may have a forked head 56 with which the eye is pivotally connected by means of a pin 57 extending through the forked head and the resilient bushing.

The means for rockably supporting the cylinder 18 and connecting the same with the part or frame 16, may comprise a bracket member 60 connected with the part 16 and a trunnioned member 61 connected with the cylinder of the shock absorber. As shown in Fig. 3, the bracket member 60 may have interfitting engagement with the frame and may be connected therewith by the bolts 62. A depending portion of the bracket member 60 has an opening or recess in which a bushing 63 is mounted. The member 61 may comprise a band or a pair of arms shaped to embrace the cylinder 18 intermediate its ends and connected therewith by welding or other suitable means, and a projecting trunnion portion or pivot 64 which is journaled to oscillate in the bushing 63. The trunnion portion 64 may be held from withdrawal from the bushing 63 by the nut 65.

With the improved shock absorber construction and the novel mounting arrangement above described, it will be seen that when the frame or part 16 moves toward the axle or part 17, as would occur during compression of the vehicle springs, the shock absorber 15 will assume a position such as that illustrated in Fig. 2 in which the shock absorber has been swung about the axis of the trunnion portion 64 and upwardly from its neutral position shown in Fig. 1. This swinging of the shock absorber will cause the resistance unit 19 to be drawn outwardly in the cylinder by the actuating rod 20. Likewise, during this swinging of the shock absorber the outer end of the actuating rod 20 will have pivotal movement relative to the part 17 and the actuating rod will assume a position in which it extends at an acute angle relative to the arm 54 as shown in Fig. 2. The axial shifting of the resistance unit 19 toward the left in the cylinder 18 will cause the expander 31 to expand the sleeve 29 and a shock-absorbing resistance will be quickly built up in the device tending to retard or restrict the movement of the parts 16, 17 toward each other.

When the parts 16 and 17 move away from each other, as would occur during the rebound movement of the springs of a vehicle, the shock absorber 15 will be rocked or swung about the axis of the trunnion portion 64 from the full line position shown in Fig. 2 to a position such as that indicated by the center line 66 which may be below the neutral position of the shock absorber. During this rebound movement the actuating rod 20 and the resistance unit 19 will be shifted inwardly of the cylinder 18 and the sleeve 29 will thereupon be expanded by the expander 30 again causing a shock-absorbing resistance to be built up in the device tending to retard movement of the parts 16 and 17 away from each other.

The rapidity with which the shock absorbing action builds up during the compression and rebound strokes, and also the degree or amount of resistance to be developed, can be controlled or varied so that the shock absorbing characteristics desired for different makes of vehicles or different operating conditions can be readily obtained. This control or variation of the shock absorbing function can be obtained by selecting appropriate taper angles for the expanders and for the corresponding coincident tapers at the opposite ends of the friction sleeve 29. I can also obtain a desired variation in the shock absorbing function by varying the spacing of the transverse pivot axis 64 of the cylinder with respect to the pivot pin 57 of the actuating rod, as will be presently explained.

For some operating conditions it may be desirable that the expanders 30 and 31 have substantially the same taper angle in which case the shock-absorbing resistance developed would be substantially or approximately the same for both compression and rebound strokes. On the other hand it may be desirable and advantageous to provide one of the expanders with a different taper angle than the other, for example, the expander 30 may have a taper angle of 22° and the expander 31 may have a taper angle of 18°. The use of different taper angles on the expanders produces a markedly different and improved shock absorbing action which can be conveniently termed a "four cycle" action. Thus when compression of the vehicle springs takes place, which may be considered the first step of the cycle, the shock absorber is swung upwardly away from its neutral position and the expander 31 causes expansion of the friction sleeve 29. Since the taper angle of this expander is relatively smaller it will more readily enter the friction sleeve and hence it will be relatively more effective in expanding the sleeve and a quick build-up of a strong shock absorbing resistance will result.

During the next step of the cycle, that is when the shock absorber is swinging downwardly toward its neutral position, the expander 30 causes expansion of the friction sleeve. Since the taper angle of this expander is relatively larger or steeper it will not enter the friction sleeve so readily and the resulting shock absorbing action will not build up so rapidly nor will it be so strong. As the shock absorber reaches its neutral position the longitudinal movement of the resistance unit becomes zero and the shock absorbing action then also diminishes to zero. Further rebound movement will swing the shock absorber downwardly below the neutral position, which may be considered to be the third step of the cycle, and the expander 31 will again expand the friction sleeve to produce a quick build-up and a relatively strong resistance.

During the fourth step of the cycle, compression of the springs again occurs and the shock absorber is swung back toward its neutral position. The expander 30 is effective during this stroke and, as in the second step of the cycle, the build-up is not so rapid and the resistance is not so strong.

The shock absorber may become stationary in its neutral position or, if the relative movement continues, it may oscillate through a series of the above-described steps or cycles. It will be noted however that with the above-mentioned relatively large and relatively small taper angles for the expanders 30 and 31, a quick build-up and a strong resistance will occur whenever the shock absorber swings away from the neutral position as in the first and third steps of the above-described cycle. Likewise, whenever the shock absorber swings toward the neutral position, as in the second and fourth step of the cycle, the build-up is less rapid and the resistance is not so strong. The result or tendency therefore is to quickly dampen the shock or relative movement in a manner which will expedite the return of the springs to the neutral position. During the swinging of the shock absorber cylinder through the neutral position, as above explained, it will be seen that the pivotal connection between the outer end of the actuating rod 20 and the rigid arm 54 will move in a straight line extending transversely of the plane of the neutral position. With the parts arranged for such straight line movement of this pivotal connection, it will be seen that the friction unit will operate with short strokes and the length of the cylinder can be very short as compared with that of friction shock absorbers heretofore constructed.

Instead of providing the expander 30 with a steeper taper angle I can reverse this arrangement and provide the expander 31 with a steeper taper angle than the expander 30 in which case the relatively quick build-up will occur during the second and fourth steps of the cycle and the slower build-up will occur during the first and third steps.

As indicated above, variations in the spacing of the transverse pivot 64 of the cylinder relative to the pivot pin 57 of the actuating rod will result in different shock absorbing actions and in further explanation of this I wish to point out that each time that the shock absorber swings through its neutral position the resistance decreases to zero and hence the shock absorber has in its path of oscillation an idle period or arc located at or adjacent the neutral position. If the shock absorber is arranged so that the transverse pivot 64 is relatively farther from the pivot pin 57 the length of this idle period or arc will be increased, and conversely, if the spacing of the pivot 64 from the pivot 57 is decreased the length of this idle period or arc will be decreased. Thus by shifting the relative position of the pivot 64 the effectiveness of the shock absorber can be varied and provision can thus be made for a certain amount of substantially free spring action if this should be desirable.

To exclude dust and water from the actuating rod 20 and the bearing in which it is slidable, I may provide a dust shield which may be in the form of an extensible bellows-like member 68 formed of rubber or any other suitable flexible or resilient material. One end of this member may have a ring portion or sleeve 68a embracing the outer end of the cylinder 18 and the other end of this member may have a disk portion 68b which embraces the outer end of the actuating rod 20. The disk portion 68b can be arranged to grip or clamp the actuating rod so that when the actuating rod is withdrawn the dust shield will be stretched or extended, as shown in Fig. 2. On the other hand, it is not necessary that the disk portion of the dust shield be clamped to the actuating rod because it can be arranged to permit sliding of the rod therethrough as shown in the modified arrangement of Fig. 9 in which such a disk portion 68c carries a bushing or insert 69 through which the actuating rod 20b is slidable.

In Figs. 10 to 12, inclusive, I show another form of shock absorber mounting which may be employed for applying a shock absorber 70 to a pair of relatively movable parts 71 and 72, such as the frame and axle members of a vehicle. The shock absorber 70 may be similar to or identical with the shock absorber 15 above described and may include a tubular cylinder 73 having a resistance unit 74 reciprocable therein and an actuating rod 75 connected with the resistance unit and extending from the cylinder.

This modified form of mounting may include a pivotal connection 75a for connecting the outer end of the actuating rod 75 with the part 72 either directly or through the medium of a rigid arm 76 carried by such part. This mounting also includes means for connecting the shock absorber cylinder 73 with the part 71 so as to provide for rocking or swinging of the cylinder about a transverse axis located intermediate its ends. The latter means may comprise a U-like bracket member 77 adapted to be connected with the part 71 by bolts or studs 79 and a trunnioned member 80 adapted to be connected with the cylinder 73 and whose trunnion portions 81 are rockably mounted in the bracket member.

As shown in Fig. 11 the bracket member 77 may have opposed openings 82 and 83 into which the trunnion portions 81 extend. The opening 82 may be tapered and may have a similarly tapered bushing 84 seated therein for rockably supporting the corresponding trunnion portion 81. The bushing 84 may be formed of any suitable material but is preferably made of soft rubber. The opening 83 of the bracket member may be threaded to receive a nut member 85 which carries a tapered bushing 86 similar to the bushing 84 above described. To facilitate assembly of the shock absorber with the bracket member 77, a slot 88 of a width greater than the diameter of one of the trunnion portions 81 may be formed in the bracket member so as to communicate with the opening 83. The nut member 85 may have spanner openings 89 therein to facilitate the insertion or removal of this member from the threaded openings 83.

The trunnioned member 80 may be formed by a pair of complemental stamped sheet metal members 80a and 80b which embrace the cylinder 73 and may be welded or otherwise connected thereto. Projecting portions of these complemental members cooperate to form the opposed trunnion portions 81 as shown in Figs. 10 and 11.

From the foregoing description and the accompanying drawings, it will now be readily seen that I have provided an improved shock absorber mounting by which a shock absorber of the direct-acting tubular type can be applied to relatively movable vehicle members or other parts to be retarded so that the shock absorber can rock or swing through, or to either side of, a neutral position during its shock absorbing function. It will be seen also that a shock absorber designed for use with my improved mounting can be much shorter in length than other direct-acting shock absorbers heretofore used, because during the swinging of the cylinder to opposite sides of its neutral position, the resistance unit will have only a small amount of longitudinal travel in the cylinder. Likewise it will be seen that during use of a shock absorber supported by my improved mounting the actuating rod of the shock absorber pivots relative to one of the movable members to be retarded and that the rocking or swinging of the cylinder takes place about a transverse axis located intermediate its ends.

It will also be seen from the drawings and the foregoing description that I have provided an improved shock absorber construction embodying a reciprocable friction unit and in which the segmental friction sleeve and expander of the friction unit have cooperating portions so formed that a full surface contact is always maintained between the expander and segments and the destructive scraping action and rapid wear heretofore found in similar shock absorbers having a line or point contact between the expander and friction sleeve is entirely eliminated.

While I have illustrated and described my improved shock absorber and mounting therefor in a more or less detailed manner, it will be understood, of course, that my invention is not limited to the specific arrangements and constructional details herein disclosed, but includes such changes and modifications as do not constitute a departure from the spirit of the invention and the scope of the appended claims.

Having thus described my invention I claim:

1. A mounting for a shock absorber of the tubular type having a reciprocable actuating rod projecting therefrom, comprising means for pivotally connecting said rod with one of a pair of relatively movable parts to be retarded, a bracket member adapted to be connected with the other of said parts and having a pair of opposed resilient bushings, and trunnions on said shock absorber intermediate its ends and engaging in said resilient bushings.

2. In a mounting for a shock absorber of the tubular type, a bracket having opposed bearings and a recess therebetween accommodating the body of the shock absorber, and a trunnioned member comprising sections connected with the body of the shock absorber and having complemental portions forming trunnions adapted to be received in said bearings.

3. In a friction shock absorber, a cylinder, and a resistance member frictionally operable in the cylinder and comprising a plurality of segments and an expander cooperating therewith, said segments and expander having curved tapered faces of which the radius of curvature is constant for all points therealong whereby full surface contact is maintained between said faces during relative movement between the segments and expander.

4. In a friction shock absorber, an elongated cylinder, a sleeve formed of segments and frictionally slidable in the cylinder, said segments having transversely curved longitudinally tapered recesses in the inner faces thereof, and an expander having transversely curved longitudinally tapered lobes engaging in said recesses and adapted to expand the sleeve upon relative longitudinal movement between the expander and segments, the radius of curvature transversely of said recesses and lobes being constant for all points therealong whereby full surface contact is maintained between the expander and segments during relative longitudinal movement thereof.

5. In a friction shock absorber, a cylinder, a resistance member frictionally operable in the cylinder and comprising a plurality of segments and an expander cooperating therewith, said segments and expander having curved tapered faces of which the radius of curvature is constant for all points therealong whereby full surface contact is maintained between said faces during relative movement between the segments and expander, and a lubricating powder confined in the cylinder and adapted to be agitated into a dust cloud by the operation of the resistance member in the cylinder.

6. In a friction shock absorber, an elongated cylinder, a sleeve formed of segments and frictionally slidable in the cylinder, said segments having transversely curved longitudinally tapered recesses in the inner faces thereof, an expander having transversely curved longitudinally tapered lobes engaging in said recesses and adapted to expand the sleeve upon relative longitudinal movement between the expander and segments, the radius of curvature transversely of said recesses and lobes being constant for all points therealong whereby full surface contact is maintained between the expander and segments during relative longitudinal movement thereof, and a lubricating powder confined in said cylinder and adapted to be agitated into a dust cloud upon operation of said sleeve and expander in the cylinder.

JACOB RUSH SNYDER.